Dec. 28, 1926. Re. 16,511
A. P. LEONARD
METHOD FOR THE MANUFACTURE OF SUGAR
Original Filed July 26, 1921 2 Sheets-Sheet 1
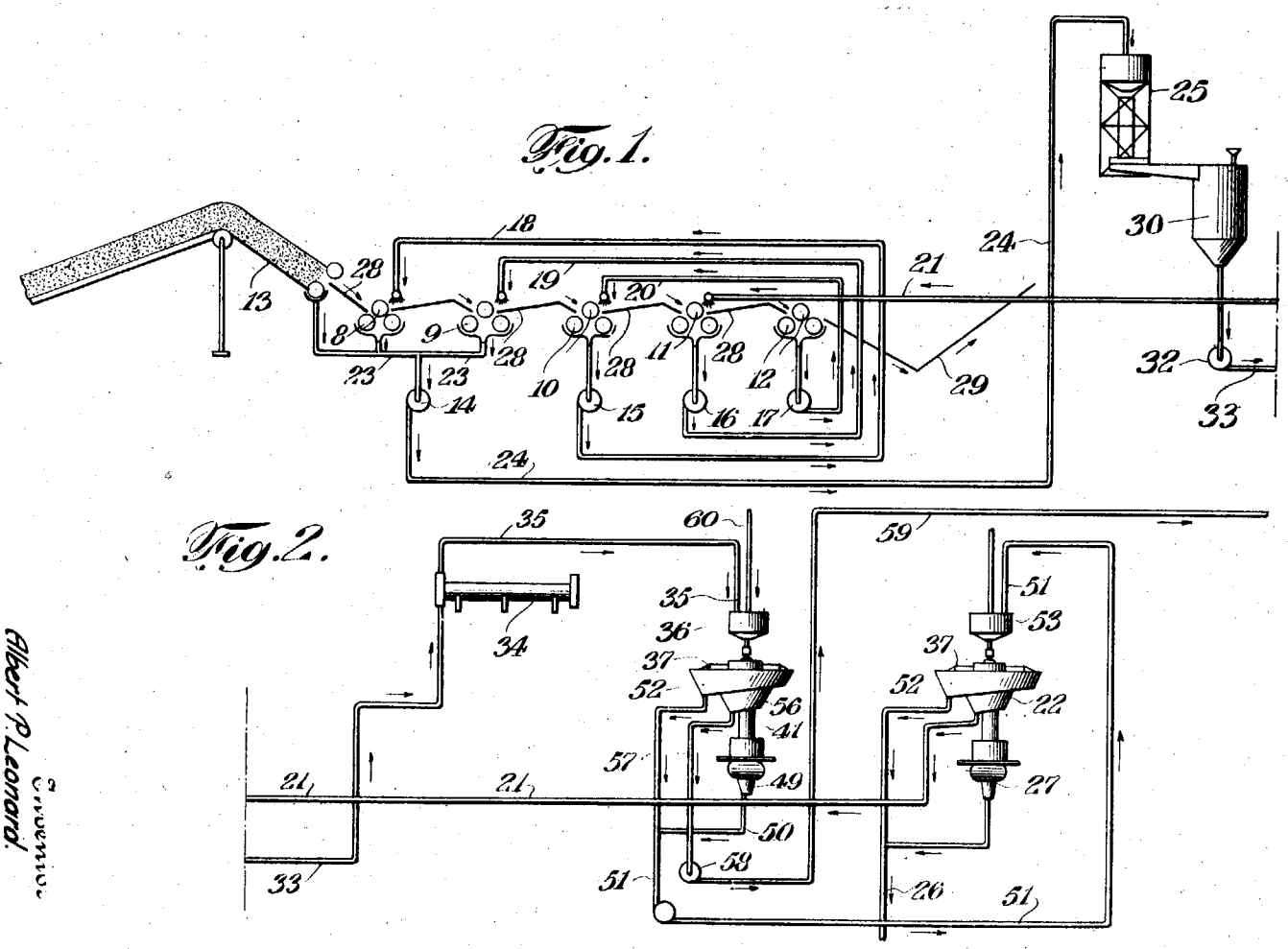
Inventor
Albert P. Leonard.
By his Attorney
E. F. Murdock Dec. 28, 1926. Re. 16,511

A. P. LEONARD

METHOD FOR THE MANUFACTURE OF SUGAR

Original Filed July 26, 1921 2 Sheets-Sheet 2

Inventor
Albert P. Leonard.

By his Attorney
E. F. Murdock.

Reissued Dec. 28, 1926. Re. 16,511

UNITED STATES PATENT OFFICE.

ALBERT P. LEONARD, OF NEW YORK, N. Y.

METHOD FOR THE MANUFACTURE OF SUGAR.

Original No. 1,568,512, dated January 5, 1926, Serial No. 487,693, filed July 26, 1921. Application for reissue filed August 31, 1926. Serial No. 132,849.

Among the principal objects which the present invention has in view are: To increase the yield of sugar extracted from sugar cane; to reduce the losses of sugar during the process of manufacture; to provide a continuously functioning apparatus; to reduce the labor costs in the recovery of sugar from the cane and by-products; to shorten the time required for the operations referred to; and to simplify the apparatus by which the operations are performed.

*Drawings.*

Figures 1 and 2 are schematic views showing the manufacturing system constructed and arranged in accordance with the present invention;

*Description.*

Figure 3:
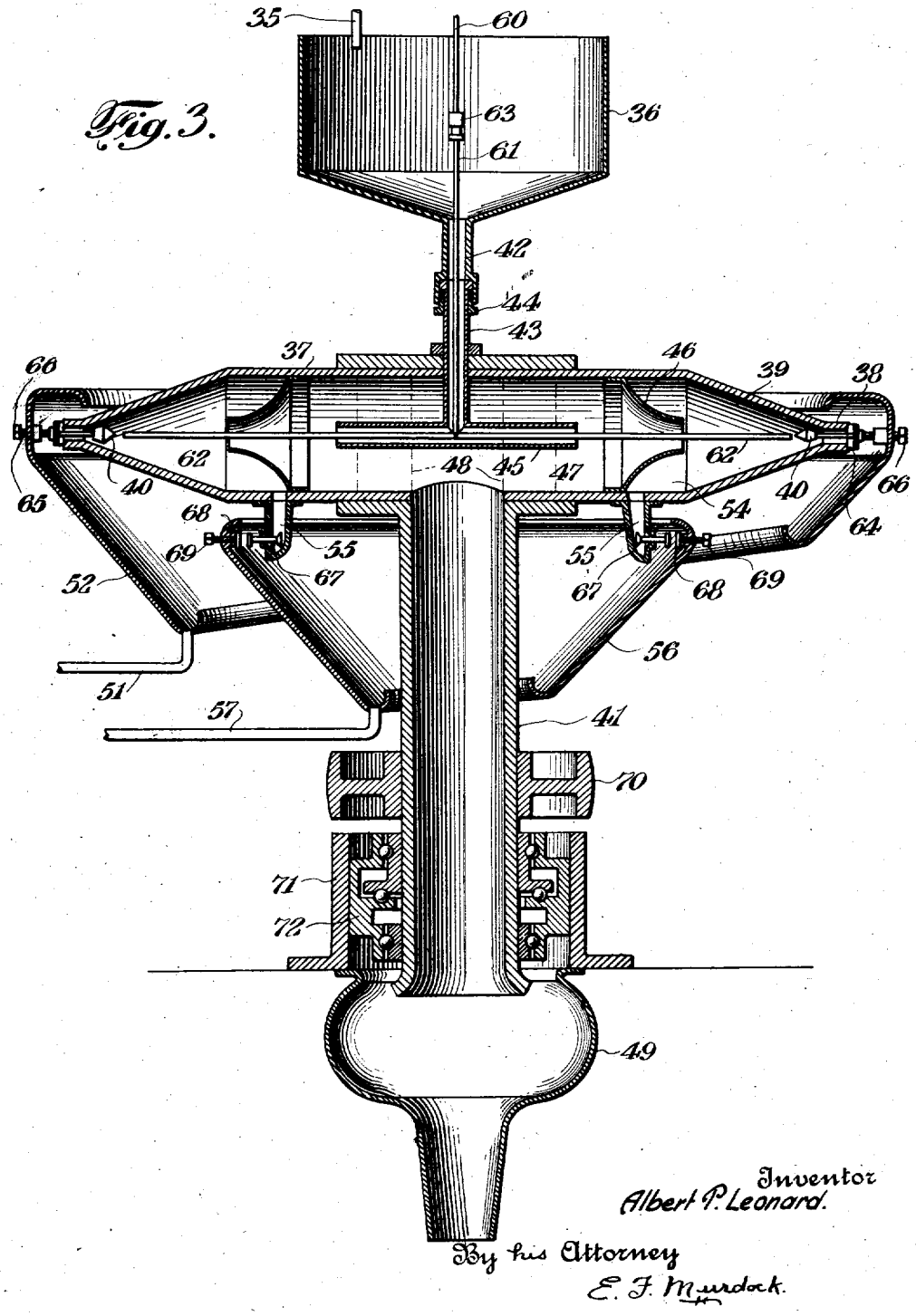
Figure 3 is a vertical section of a centrifugal separator employed in the present invention.

As indicated in Figures 1 and 2 the sugar bearing material or cane is transported successively to the mills 8, 9, 10, 11 and 12 of a battery of such mills from a conveyor 13, where it is repeatedly crushed and macerated. The mills deliver the expressed raw and mixed or dilute juice to return juice pumps 15, 16 and 17, and ultimately all of the raw and mixed or dilute juice to the pump 14 alone, the product of the said mills being rendered as a syrup by water and the mixed or diluted syrup delivered thereto by the pipes 18, 19, 20 and 21, the last of which pipes delivers a clarified juice or water slightly saccharine, the latter product being a portion of the juice or syrup delivered from the pump 14 to and through a weigher mechanism 25 and a clarifier or liming tank 30 to the separator and from the clear juice hoppers thereof.

As seen in the drawings the mills 9 and 10, which are of the usual 3-roller type, are supplied with a macerating medium consisting of water or preferably the juice extracted by the mills 10 and 11 while the mixed juice from the mills 8 and 9 is conveyed by the pipes 23 to the pump 14, to be delivered therefrom by means of the pipes 24 to the juice weigher 25. The juices which are delivered from the mills 10 and 11 are mixed not only with the juices of the mill 12, but also the clear juice from the last separator and from the clear juice hopper 22 thereof by way of the pipe 21. The dilute sugar solution delivered by the pipe 21, after passing through the mill 12, is transferred by the pump 17 to the mill 11 where it reenters the circulatory system and is eventually conveyed by the pipe 24 to the juice weigher 25. Thus it will be seen that in the present method the only waste product which is finally disposed of is passed by the pipe 26 from the mud and scum outlets 52 and 27 of the last or final centrifugal separator with which the manufacturing system is provided.

The bagasse or crushed cane is carried by means of intermediate carriers 28 from each of the mills to the one next succeeding, to be finally transferred by the elevator 29 to the furnaces for use as fuel.

As the juice passes the juice weigher, it is delivered to the liming tank 30, where it is treated with a small percentage of lime employed to neutralize the acids in the juice and perform the customary clarification when heated. The lime in the form of milk of lime may be introduced through the funnel 31, and pipe connected therewith, which, as shown in Fig. 1 of the drawings, conveys the lime milk to near the bottom of the liming tank. From the liming tank the juice is forced by the pump 32 and the pipe 33 connected therewith through the heater 34. After being heated in the heater which is of the usual construction and operation, the juices are conveyed by the pipe 35 to the hopper 36 of a centrifugal rotary separator 37.

As shown best in Fig. 3 of the drawings, the separator 37 consists primarily of a double pointed elongated tubular chamber, the delivery ends 38 whereof are contracted, forming the laterally extending apex of conical ends 39 of the separator. The openings in the ends 38 are normally open, but are provided with valves 40 by which their degree of opening may be regulated. The tubular chamber of the separator 37 is mounted on the tubular shaft 41, into which flows the scum or lighter detritus contained in the liquid which is delivered from the hopper 36 by way of the pivotally connected pipes 42 and 43. The pipes 42 and 43 are connected by a gland packing 44.

The pipe 43 is rigidly connected with distributing extensions 45, by which the juices are delivered to the separator 37, at a point removed from the shaft 41. As the rotating element consisting of the separator 37, shaft 41, and extensions 45 is rapidly rotated, the liquid contained therein has imparted thereto a centrifugal effect, so that, on leaving the extensions 45, the heavier materials contained in the liquid are immediately carried towards the frusto-conical baffles 46.

It is obvious that when the crude liquor is delivered from the extensions 45 at the rear of the baffles 46, the material separates on the lines of their specific gravity, so that the scum and lighter particles will occupy the region between the lines 47 and 48. The lines 48 are coincident with the inside surface of the tubular shaft 41, so that as the lighter material, being less affected by the centrifugal operation of the apparatus, and by the approach to the center of rotation thereof, flows into the shaft 41, to be carried thereby to the outlet hopper 49, from whence it is carried, as seen in Figure 2 of the drawings, by means of the pipe 50, to the refuse pipe 51, through which the deposits in the hopper 52 are conveyed to the hopper 53 of the next succeeding separator.

When the heavier products pass through the somewhat constricted openings in the baffles 46, they pass into the conical ends 39, where again separation between the lighter and heavier products takes place. The lighter product, which in this region is the clear juice, is forced backward under the overhang of the baffles 46, into the space 54, from which lead the down pipes 55. The pipes 55 are normally opened so that the juices deposited therein may flow into the hopper 56, from which the accumulated juice is carried by the delivery pipe 57, through the pump 58, and the pipe 59, to other apparatuses, whereby the concentration of the clear juice and crystallization and separation of the sugar from the mother liquor is carried on.

When the separator herein disclosed is fully functioning, the detritus or mud suspended in the liquid is separated therefrom and delivered to the contracted ends 38 of the separator 37. To supply the necessary liquid for operation of the system, water is delivered thereto by circulating pipes 60 and 61 and lateral extensions 62 thereof. The stationary pipe 60 and rotary pipe 61 are suitably connected by the gland packing 63, as seen best in Figure 3 of the drawings. The delivery ends of the lateral extensions 62 are juxtaposed to the conical heads of the valves 40, so that water delivered by the said pipe flows around the said valves, and forms a clearing stream through the openings in the ends 38, thus preventing the damming of the openings through the said ends by the accumulation of heavy matter.

It becomes expedient at times to regulate the flow through the ends 38. To this end the valves 40 are held from seating by annular bands 64. The bands 64 are suitably supported on adjusting screws 65, the heads 66 whereof extend beyond the wall of the hopper 52, to be manipulated by the attendant to contract or expand the band 64, and thereby move the valves 40 further from, or permit them to move nearer to, their seats, to vary the delivery openings in the ends 38. A similar construction is provided for regulating the seating of the valves 67, which control the delivery openings of the down pipes 55. This control is exercised by contracting and expanding the bands 68 by means of the set screws 69.

It is obvious that if the flow of the clear juice from the down pipe 55 is too great to permit the liquid to remain in the ends 39, and in the spaces 54 sufficiently long to properly separate, the flow from the said down pipes is retarded by adjusting the bands 68, and the valves 67 operated thereby. Likewise, if the flow from the ends 38 is too great to permit the proper separation, this is regulated by means of the screws 66 and the band 64.

The separator 37 and the tubular shaft 41 connected therewith are rotated very rapidly, employing for this purpose any suitable means, that shown in the present drawings being the belt pulley 70, which is operatively connected with any suitable prime mover by means of a belt. It will be understood that the pulley 70 and parts connected therewith may be substituted by any other form of driving mechanism, such as an independent electric motor. The standard 41 is supported in service by any suitable bearing, such as the pedestal 71, and the ball races 72, mounted thereon.

By reference to the schematic view shown in Figures 1 and 2 of the drawings, it will be seen that the mud separated from the clear juice delivered to the hopper 52 in the first separator 37 passes by means of the pipe 51 to the receiving hopper 53 of the second separator 37. It will also be understood that the performance of the second separator and parts connected therewith is exactly the same as that above described with regard to the first separator, the principal difference in the result being due to the fact that the liquor furnished to the second separator has been largely denuded of all saccharine matter. A further difference in the utilization of the second separator is to be found in that the hopper 22 of the second separator, which corresponds to the hopper 56 of the first separator, delivers the clear juice thereof, which is slightly saccharine, to the pipe 21, through which it is carried back to the mill 12 to furnish the necessary liquid therefor, which as above stated, is transferred therefrom with the richer product by way of the pumps 17 and pipe 20, to the mill 11, and again carried through the remainder of the milling process and clarification plant. It will also be observed that the refuse delivered by the second separator to its hopper 52, is conveyed by the pipe 26 to the refuse pound or dump, for use as fertilizer or treated in any other suitable manner.

It will be observed that following the method herein outlined by using an apparatus such as disclosed, the separation of the saccharine matter from the juices treated is continuous, and may be carried to any degree deemed wise or profitable, for while I have here described the apparatus as employing two separators, it is obvious that more may be employed, if desired. Also it will be seen that by returning continuously the clear juice from the final separation to the milling plant for use as a macerating medium, the loss of saccharine matter in the juices is minimized to the smallest degree, due to the fact that the said juices are employed over and over again in forming the necessary solution for separating the soluble from the insoluble constituent of the base materials or mud.

*Claims:*

1. A method of manufacturing sugar comprising passing bagasse successively through a series of crushing mills, subjecting the bagasse at each mill to washing by a circulatory liquid system, treating the liquid from said mills in separators, extracting clear juices from said separators, separating sugar from the juices from one separator, admitting extraneous water into the system at said separators, and returning clear juice from the other of said separators to the mills.

2. A method of manufacturing sugar comprising passing bagasse successively through a series of crushing mills, and conveying expressed liquids from said mills to separators, admitting water at the separators, extracting clear juices from said separators, separating sugar from the juices of one separator, and returning the other clear juices to the mills for washing the bagasse.

3. In a method of manufacturing sugar, the treatment of bagasse successively in a series of crushing mills to extract juice therefrom, the subsequent treatment of the extracted juices in separators, for separating the clear juices therefrom, extracting sugar from the clear juices from one separator, the addition of water to the residuum of the separators, and the subsequent return of the other clear juices to the mills for action on bagasse therein.

4. A method of manufacturing sugar comprising passing bagasse successively through a series of crushing mills, conveying juice from the foremost mills to separators, introducing water into said separators, extracting the clear juices therefrom, extracting sugar from the clear juices of one separator, and returning the clear juices from the other of said separators to the end mill, returning the juice from said end mill to the mill next in advance, and conveying juice from all intermediate mills to the foremost mills.

5. A method of manufacturing sugar comprising passing bagasse successively through a series of crushing mills, conveying juice from the foremost mills to separators, extracting clear juices from said separators, separating sugar from the clear juices of one separator, returning the clear juice of another separator to the end mill of the series, returning the juice from said end mill to the mill next in advance, returning the juice from said last-named mill to an intermediate mill, and returning the juice from the intermediate mill to the foremost mills.

6. A method of manufacturing sugar comprising passing bagasse successively through a series of crushing mills, conveying juice from the foremost mills to separators, extracting the clear juices from said separators, separating sugar from the clear juice of one separator, introducing water into the residuum in another separator, returning the clear juice from the separators to the end mill of the series, returning the juice from said end mill to the mill next in advance, returning the juice from said last-named mill to an intermediate mill, and returning the juice from said intermediate mill to the foremost mills.

In testimony whereof, I have signed my name to this specification this 26th day of August, 1926.

ALBERT P. LEONARD.